US012342352B2

(12) United States Patent
Marzban et al.

(10) Patent No.: US 12,342,352 B2
(45) Date of Patent: Jun. 24, 2025

(54) FLEXIBLE SLOT GROUP FOR MULTIPLE SLOT CONTROL CHANNEL MONITORING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Jing Sun, San Diego, CA (US); Tao Luo, San Diego, CA (US); Xiaoxia Zhang, San Diego, CA (US); Qingjiang Tian, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/885,262

(22) Filed: Aug. 10, 2022

(65) Prior Publication Data

US 2023/0100953 A1    Mar. 30, 2023

Related U.S. Application Data

(60) Provisional application No. 63/261,916, filed on Sep. 30, 2021.

(51) Int. Cl.
*H04W 72/04* (2023.01)
*H04W 72/0446* (2023.01)
*H04W 72/23* (2023.01)
*H04W 72/12* (2023.01)

(52) U.S. Cl.
CPC ....... *H04W 72/23* (2023.01); *H04W 72/0446* (2013.01)

(58) Field of Classification Search
None
See application file for complete search history.

(56) References Cited

U.S. PATENT DOCUMENTS

| 2022/0287063 | A1* | 9/2022 | Lin | H04W 72/23 |
| 2022/0295320 | A1* | 9/2022 | Lin | H04W 72/23 |
| 2023/0079377 | A1* | 3/2023 | Srinivasan | H04L 5/0078 370/328 |
| 2023/0131118 | A1* | 4/2023 | Kim | H04W 52/0216 370/311 |
| 2023/0189305 | A1* | 6/2023 | Oteri | H04L 5/0053 370/329 |
| 2023/0396385 | A1* | 12/2023 | Kwak | H04L 5/0094 |
| 2024/0121795 | A1* | 4/2024 | Takahashi | H04W 72/51 |

* cited by examiner

*Primary Examiner* — Eunsook Choi
(74) *Attorney, Agent, or Firm* — Harrity & Harrity, LLP

(57) ABSTRACT

Various aspects of the present disclosure generally relate to wireless communication. In some aspects, a user equipment (UE) may transmit capability information indicating a physical downlink control channel (PDCCH) monitoring capability, wherein the PDCCH monitoring capability indicates a minimum length for a group of slots and a maximum number of consecutive slots including at least one search space within the group of slots. The UE may receive a search space set configuration associated with a plurality of search spaces, wherein the search space set configuration is based at least in part on a slot group length that is greater than or equal to the minimum length. The UE may monitor for control information based at least in part on the search space set configuration. Numerous other aspects are described.

22 Claims, 11 Drawing Sheets

FLEXIBLE SLOT GROUP FOR MULTIPLE SLOT CONTROL CHANNEL MONITORING

CROSS-REFERENCE TO RELATED APPLICATION

This Patent Application claims priority to U.S. Provisional Patent Application No. 63/261,916, filed on Sep. 30, 2021, entitled "FLEXIBLE SLOT GROUP FOR MULTIPLE SLOT CONTROL CHANNEL MONITORING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a flexible slot group for multiple slot control channel monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting capability information indicating a physical downlink control channel (PDCCH) monitoring capability, wherein the PDCCH monitoring capability indicates a minimum length for a group of slots and a maximum number of consecutive slots including at least one search space within the group of slots. The method may include receiving a search space set configuration associated with a plurality of search spaces, wherein the search space set configuration is based at least in part on a slot group length that is greater than or equal to the minimum length. The method may include monitoring for control information based at least in part on the search space set configuration.

Some aspects described herein relate to a method of wireless communication performed by a base station. The method may include receiving, from a UE, capability information indicating a PDCCH monitoring capability, wherein the PDCCH monitoring capability indicates a minimum length for a group of slots and a maximum number of consecutive slots that include at least one search space within the group of slots. The method may include transmitting a search space set configuration associated with a plurality of search spaces, wherein the search space set configuration is based at least in part on a slot group length that is greater than or equal to the minimum length. The method may include transmitting control information based at least in part on the search space set configuration.

Some aspects described herein relate to a method of wireless communication performed by a network node. The method may include receiving, from a UE, capability information indicating a PDCCH monitoring capability, wherein the PDCCH monitoring capability indicates a minimum length for a group of slots and a maximum number of consecutive slots that include at least one search space within the group of slots. The method may include transmitting a search space set configuration associated with a plurality of search spaces, wherein the search space set configuration is based at least in part on a slot group length that is greater than or equal to the minimum length. The method may include transmitting control information based at least in part on the search space set configuration.

Some aspects described herein relate to a UE for wireless communication. The user equipment may include a memory and one or more processors coupled to the memory. The one or more processors may be configured to transmit capability information indicating a PDCCH monitoring capability, wherein the PDCCH monitoring capability indicates a minimum length for a group of slots and a maximum number of consecutive slots including at least one search space within the group of slots. The one or more processors may be configured to receive a search space set configuration associated with a plurality of search spaces, wherein the search space set configuration is based at least in part on a slot group length that is greater than or equal to the minimum length. The one or more processors may be configured to monitor for control information based at least in part on the search space set configuration.

Some aspects described herein relate to a base station for wireless communication. The base station may include a memory and one or more processors coupled to the memory.

The one or more processors may be configured to receive, from a UE, capability information indicating a PDCCH monitoring capability, wherein the PDCCH monitoring capability indicates a minimum length for a group of slots and a maximum number of consecutive slots that include at least one search space within the group of slots. The one or more processors may be configured to transmit a search space set configuration associated with a plurality of search spaces, wherein the search space set configuration is based at least in part on a slot group length that is greater than or equal to the minimum length. The one or more processors may be configured to transmit control information based at least in part on the search space set configuration.

Some aspects described herein relate to a network node for wireless communication. The network node may include a memory and one or more processors coupled to the memory. The one or more processors may be configured to receive, from a UE, capability information indicating a PDCCH monitoring capability, wherein the PDCCH monitoring capability indicates a minimum length for a group of slots and a maximum number of consecutive slots that include at least one search space within the group of slots. The one or more processors may be configured to transmit a search space set configuration associated with a plurality of search spaces, wherein the search space set configuration is based at least in part on a slot group length that is greater than or equal to the minimum length. The one or more processors may be configured to transmit control information based at least in part on the search space set configuration.

Some aspects described herein relate to a non-transitory computer-readable medium that stores a set of instructions for wireless communication by a UE. The set of instructions, when executed by one or more processors of the UE, may cause the UE to transmit capability information indicating a PDCCH monitoring capability, wherein the PDCCH monitoring capability indicates a minimum length for a group of slots and a maximum number of consecutive slots including at least one search space within the group of slots. The set of instructions, when executed by one or more processors of the UE, may cause the UE to receive a search space set configuration associated with a plurality of search spaces, wherein the search space set configuration is based at least in part on a slot group length that is greater than or equal to the minimum length. The set of instructions, when executed by one or more processors of the UE, may cause the UE to monitor for control information based at least in part on the search space set configuration.

Some aspects described herein relate to a non-transitory computer-readable medium that stores a set of instructions for wireless communication by a base station. The set of instructions, when executed by one or more processors of the base station, may cause the base station to receive, from a UE, capability information indicating a PDCCH monitoring capability, wherein the PDCCH monitoring capability indicates a minimum length for a group of slots and a maximum number of consecutive slots that include at least one search space within the group of slots. The set of instructions, when executed by one or more processors of the base station, may cause the base station to transmit a search space set configuration associated with a plurality of search spaces, wherein the search space set configuration is based at least in part on a slot group length that is greater than or equal to the minimum length. The set of instructions, when executed by one or more processors of the base station, may cause the base station to transmit control information based at least in part on the search space set configuration.

Some aspects described herein relate to a non-transitory computer-readable medium that stores a set of instructions for wireless communication by a network node. The set of instructions, when executed by one or more processors of the network node, may cause the network node to receive, from a UE, capability information indicating a PDCCH monitoring capability, wherein the PDCCH monitoring capability indicates a minimum length for a group of slots and a maximum number of consecutive slots that include at least one search space within the group of slots. The set of instructions, when executed by one or more processors of the network node, may cause the network node to transmit a search space set configuration associated with a plurality of search spaces, wherein the search space set configuration is based at least in part on a slot group length that is greater than or equal to the minimum length. The set of instructions, when executed by one or more processors of the network node, may cause the network node to transmit control information based at least in part on the search space set configuration.

Some aspects described herein relate to an apparatus for wireless communication. The apparatus may include means for transmitting capability information indicating a PDCCH monitoring capability, wherein the PDCCH monitoring capability indicates a minimum length for a group of slots and a maximum number of consecutive slots including at least one search space within the group of slots. The apparatus may include means for receiving a search space set configuration associated with a plurality of search spaces, wherein the search space set configuration is based at least in part on a slot group length that is greater than or equal to the minimum length. The apparatus may include means for monitoring for control information based at least in part on the search space set configuration.

Some aspects described herein relate to an apparatus for wireless communication. The apparatus may include means for receiving, from a UE, capability information indicating a PDCCH monitoring capability, wherein the PDCCH monitoring capability indicates a minimum length for a group of slots and a maximum number of consecutive slots that include at least one search space within the group of slots. The apparatus may include means for transmitting a search space set configuration associated with a plurality of search spaces, wherein the search space set configuration is based at least in part on a slot group length that is greater than or equal to the minimum length. The apparatus may include means for transmitting control information based at least in part on the search space set configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
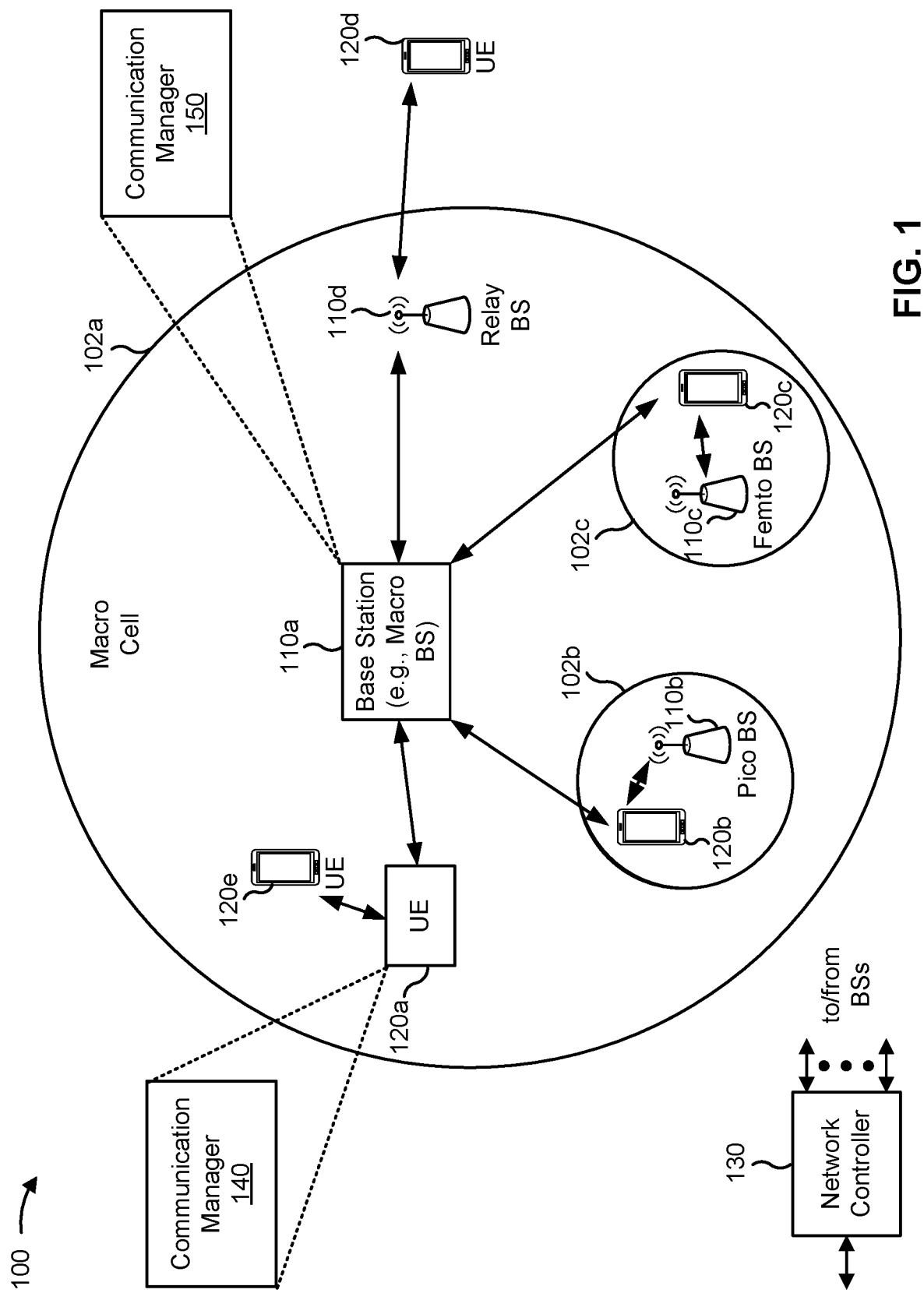
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit capability information indicating a physical downlink control channel (PDCCH) monitoring capability, wherein the PDCCH monitoring capability indicates a minimum length for a group of slots and a maximum number of consecutive slots including at least one search space within the group of slots; receive a search space set configuration associated with a plurality of search spaces, wherein the search space set configuration is based at least in part on a slot group length that is greater than or equal to the minimum length; and monitor for control information based at least in part on the search space set configuration. Additionally, or alternatively, the communication manager 140 may perform one or more other operations described herein.

In some aspects, the base station 110 may include a communication manager 150. As described in more detail elsewhere herein, the communication manager 150 may receive, from a UE, capability information indicating a PDCCH monitoring capability, wherein the PDCCH monitoring capability indicates a minimum length for a group of slots and a maximum number of consecutive slots that include at least one search space within the group of slots; transmit a search space set configuration associated with a plurality of search spaces, wherein the search space set configuration is based at least in part on a slot group length that is greater than or equal to the minimum length; and transmit control information based at least in part on the search space set configuration. Additionally, or alternatively, the communication manager 150 may perform one or more other operations described herein.

As indicated above, FIG. 1 is provided as an example. Other examples may differ from what is described with regard to FIG. 1.

Deployment of communication systems, such as 5G/NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a NB, eNB, NR BS, 5G NB, gNB, access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
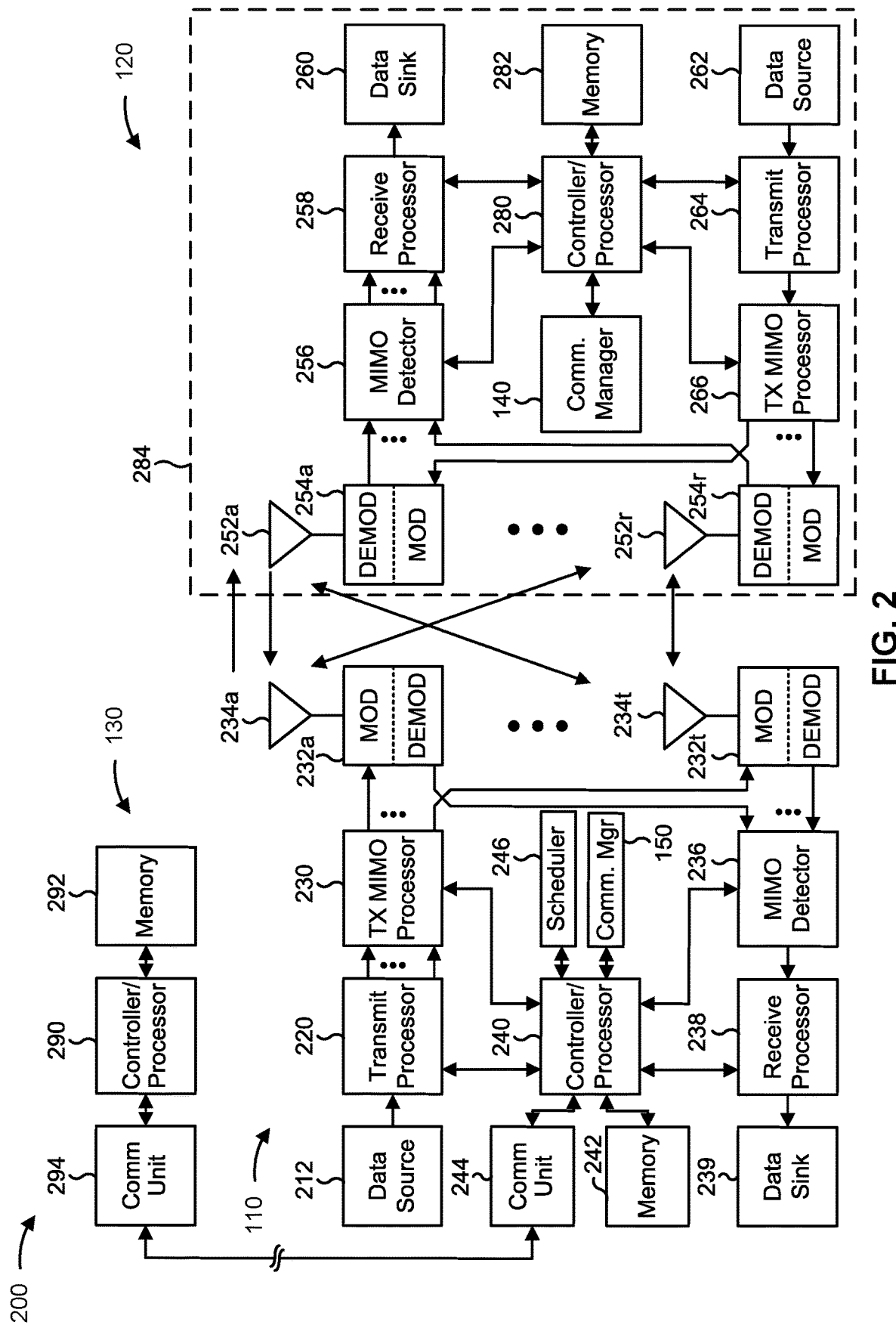
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with a flexible slot group based PDCCH monitoring, as described in more detail elsewhere herein.

Figure 8:
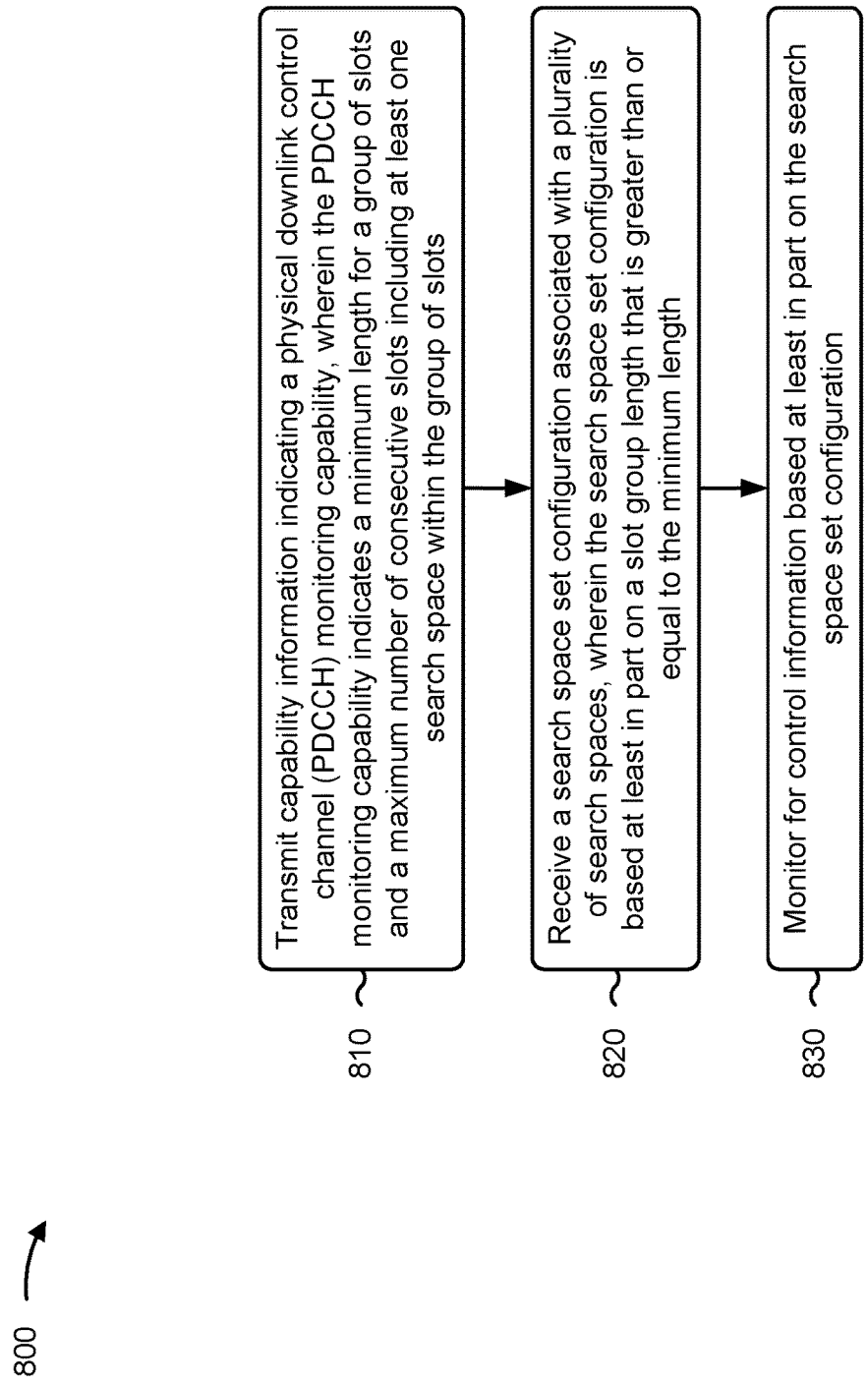
FIG. 8 is a diagram illustrating an example process performed, for example, by a UE, in accordance with the present disclosure.
Figure 9:
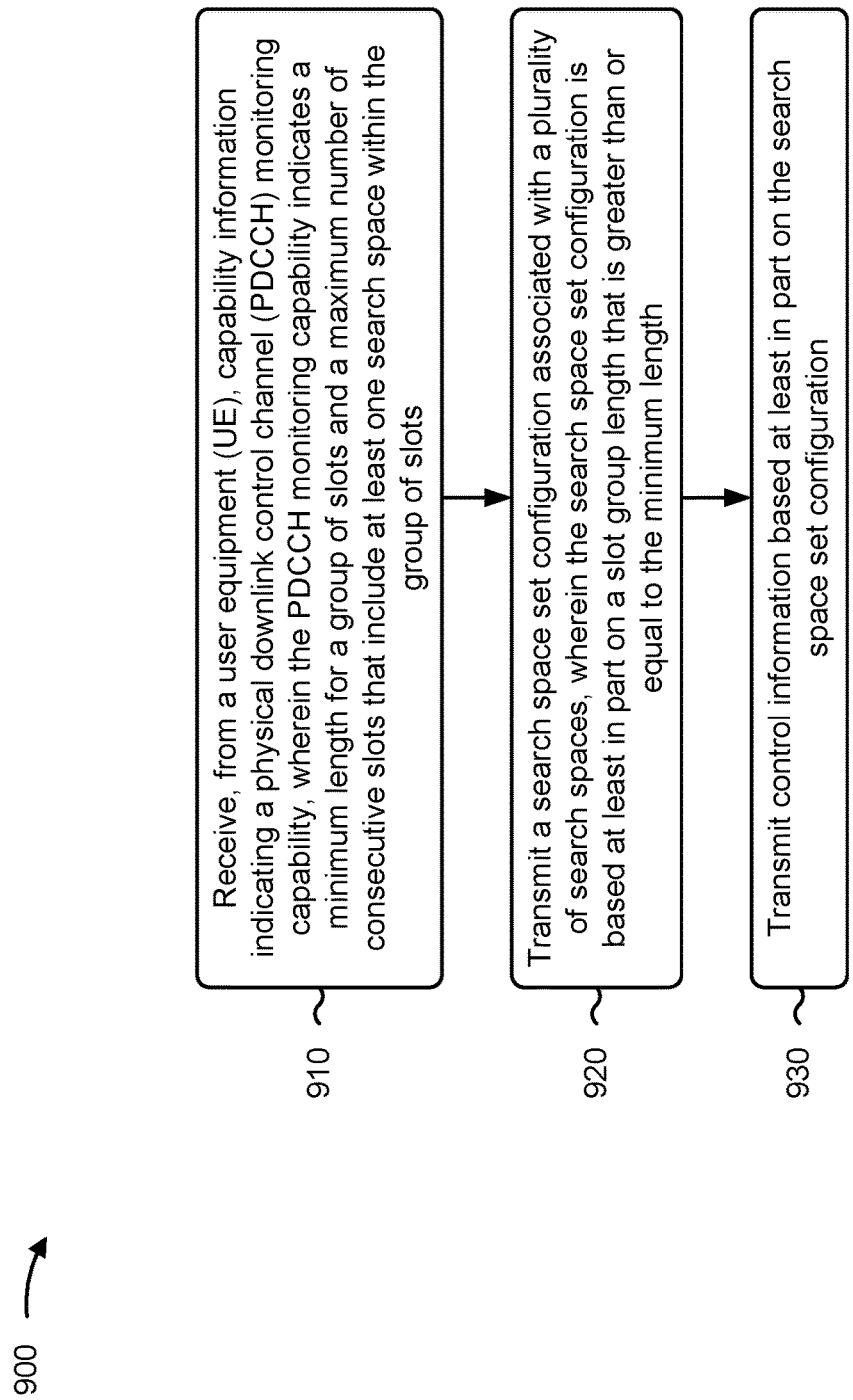
FIG. 9 is a diagram illustrating an example process performed, for example, by a base station, in accordance with the present disclosure.

For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for transmitting capability information indicating a PDCCH monitoring capability, wherein the PDCCH monitoring capability indicates a minimum length for a group of slots and a maximum number of consecutive slots including at least one search space within the group of slots; means for receiving a search space set configuration associated with a plurality of search spaces, wherein the search space set configuration is based at least in part on a slot group length that is greater than or equal to the minimum length; and/or means for monitoring for control information based at least in part on the search space set configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, capability information indicating a PDCCH monitoring capability, wherein the PDCCH monitoring capability indicates a minimum length for a group of slots and a maximum number of consecutive slots that include at least one search space within the group of slots; means for transmitting a search space set configuration associated with a plurality of search spaces, wherein the search space set configuration is based at least in part on a slot group length that is greater than or equal to the minimum length; and/or means for transmitting control information based at least in part on the search space set configuration. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
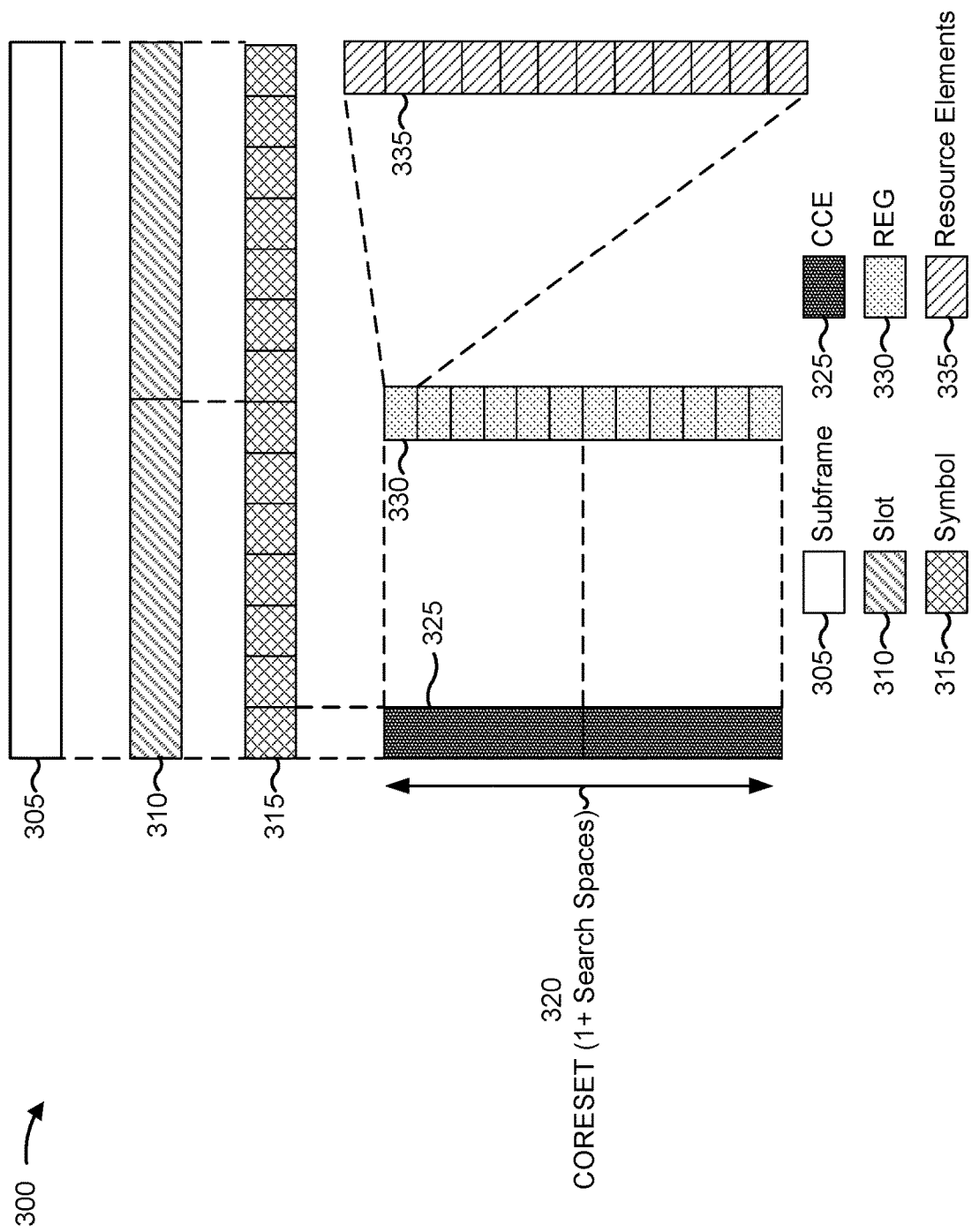
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A downlink channel may include a PDCCH that carries DCI, a PDSCH that carries downlink data, or a physical broadcast channel (PBCH) that carries system information, among other examples. In some aspects, PDSCH communications may be scheduled by PDCCH communications. A search space may include all possible locations (e.g., in time and/or frequency) where a PDCCH may be located.

A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

The one or more search spaces may be indicated by a search space set configuration. A search space set configuration may allocate a plurality of search spaces in slots. The allocation of the search spaces may be required to conform with a UE's capabilities for blind decoding and CCEs, as described in more detail elsewhere herein. The techniques and apparatuses described herein provide a flexible approach for how to arrange search spaces across slots, based at least in part on a slot group length parameter and a minimum length for a group of slots.

As indicated above, FIG. 3 is provided as an example. Other examples may differ from what is described with respect to FIG. 3.

Figure 4:
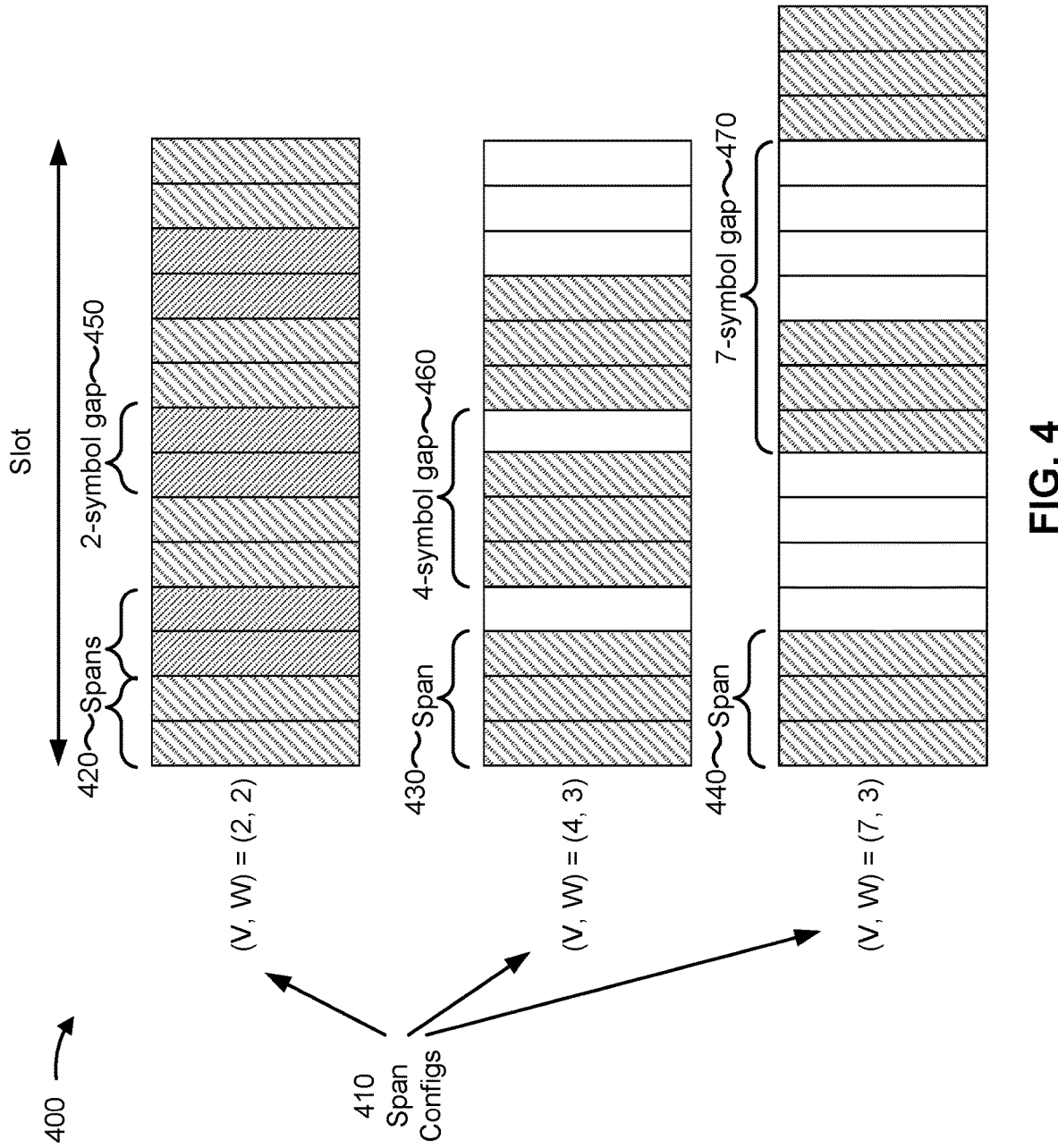
FIG. 4 is a diagram illustrating an example of spans in a slot for physical downlink control channel (PDCCH) monitoring, in accordance with the present disclosure.

FIG. 4 is a diagram illustrating an example 400 of spans in a slot for PDCCH monitoring, in accordance with the present disclosure.

In some RATs, such as 3GPP Release 15 of 5G/NR, different PDCCH monitoring capabilities are defined. As an example, a feature group (FG) 3-1 (which may be mandatory for Release 15 UEs to support) may indicate that the UE is capable of monitoring all PDCCH candidates for scheduling data that are within the first few symbols of a slot. As another example, an FG 3-5b (which may be optional for Release 15 UEs to support) may be defined based at least in part on a span concept. A span is a number of consecutive symbols in a slot where the UE is configured to monitor a PDCCH. Each PDCCH monitoring occasion is within one span. A slot may include multiple spans, and a span may include one or more PDCCH candidates. Different span configurations may be supported.

In some networks, such as a 5G/NR network, a network node may transmit a PDCCH communication (e.g., including control information, such as DCI) based at least in part on a search space set. As used herein, "transmitting a PDCCH" should be understood to be synonymous with "transmitting a communication using a PDCCH". A given search space set defines candidates that may carry a PDCCH communication within the search space set, where each candidate is associated with one or more CCEs. "Candidate" is used interchangeably herein with "PDCCH candidate." A CCE may be composed of multiple REGs. A REG may include one resource block and one OFDM symbol. One or more search space sets may be associated with a control resource set (CORESET). In some networks, such as a 5G/NR network, a network node may flexibly schedule and/or transmit the PDCCH. In other words, transmission of the PDCCH in the 5G/NR network is not limited to a particular set of frequency resources and/or time resources in a given radio frame, as in the case of, for example, an LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding procedure). "Blind decoding" involves attempting to decode a received PDCCH using a hypothesis. If the PDCCH is directed to the UE (using a radio network temporary identifier associated with the UE), the UE may successfully decode the received PDCCH based on the radio network temporary identifier and obtain DCI transmitted using the PDCCH. A UE may signal a capability indicating how many non-overlapping CCEs and blind decodes (BDs) the UE is capable of handling. In some cases (e.g., 3GPP Release 15 of 5G/NR), limits on the number of non-overlapping CCEs and BDs are defined on a per-slot basis. Thus, a large number of CCEs/BDs (in the extreme case, all of them) may be configured within one span. This increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient for efficient UE communication. For example, for a subcarrier spacing (SCS) of 30 kilohertz (kHz) and a span capability of (V,W)=(2,2), each span can have 8 CCEs. Hence, only one candidate of aggregation level=8 can be supported.

To address the above issues, 3GPP Release 16 of 5G/NR introduced a PDCCH monitoring capability that is based at least in part on a span configuration of the UE (as described further below). To improve scheduling flexibility, the number of non-overlapping CCEs and BDs per slot are increased as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability. In other words, slot-based monitoring is monitoring for which CCE/BD limits are defined per slot, whereas span-based monitoring is monitoring for which CCE/BD limits are defined per span.

In some cases, channel bandwidth may be wide, and therefore, subcarrier spacing may be increased (e.g., to 960 KHz or 480 KHz) and individual slots may be smaller (e.g., 1/64 ms for a 960 kHz subcarrier spacing or 1/32 ms for a 480 kHz subcarrier spacing). For such short slots, the per-slot PDCCH monitoring capability of a UE may decrease to a certain level such that only a few BDs and a few CCEs are available per slot. Furthermore, when the UE is monitoring the PDCCH, if no valid grants are detected, the UE may enter a "micro-sleep" mode for power saving. The micro-sleep may only be effective if the separation between two PDCCH monitoring occasions is large enough. Given the smaller slot length and the high SCS, the separation between slots may be small, and therefore, the chance of the UE entering a micro-sleep may be low. As a result, power consumption may increase, and a battery life of the UE may decrease. Some radio access technologies may support multi-slot PDCCH monitoring, which is a capability that enables the UE to monitor the PDCCH once every few slots, instead of per slot. Thus, more BDs/CCEs can be included per monitoring occasion, and more micro-sleep gain can be achieved.

In some cases, the multi-slot PDCCH monitoring capability of the UE may be enabled in different configurations. For example, in a first configuration, the separation between two bands may be fixed to X slots. This may allow for simpler BD/CCE budget management (e.g., overbooking and dropping), but may limit a flexibility of the PDCCH monitoring capabilities of the UE. In a second configuration, the separation between the two bands may be flexible (but needs to be at least X slots). This may enable higher flexibility in the PDCCH monitoring capabilities of the UE but may result in more complicated BD/CCE budget management.

FIG. 4 shows a set of slots that are associated with respective span configurations, shown by reference number 410. A span configuration may identify a minimum spacing V between the starting symbol of two spans and a maximum span duration W. If a UE monitors a PDCCH on a cell according to combination (V,W), the UE supports PDCCH monitoring occasions in any symbol of a slot with minimum time separation of V symbols between the first symbol of two consecutive spans, including across slots. A span starts at a first symbol where a PDCCH monitoring occasion starts and ends at a last symbol where a PDCCH monitoring occasion ends, where the number of symbols of the span is at most W.

The spans corresponding to span configurations (2, 2), (4, 3), and (7, 3) are shown by reference numbers 420, 430, and 440, respectively. The spans shown by reference number 420 are shown using alternating diagonal hatching, since these spans are adjacent to each other and would be difficult to differentiate otherwise. The spans shown by reference numbers 430 and 440 are separated by symbols that are not included in a span, which are shown by white (unfilled) rectangles.

The minimum spacing V is shown for span configurations (2, 2), (4, 3), and (7, 3) by reference numbers 450, 460, and 470, respectively. It should be noted that V defines a minimum spacing, so starting symbols of a pair of spans associated with span configuration (2, 2) may be two or more symbols apart from each other. Furthermore, the maximum span duration W defines a maximum span duration, so the span shown by reference number 430 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span shown by reference number 420/430/440, and a per-span capability for a number of non-overlapped CCEs may identify a maximum number of non-overlapped CCEs that can be configured in a span shown by reference number 420/430/440. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations.

As indicated above, FIG. 4 is provided as an example. Other examples may differ from what is described with respect to FIG. 4.

Figure 5:
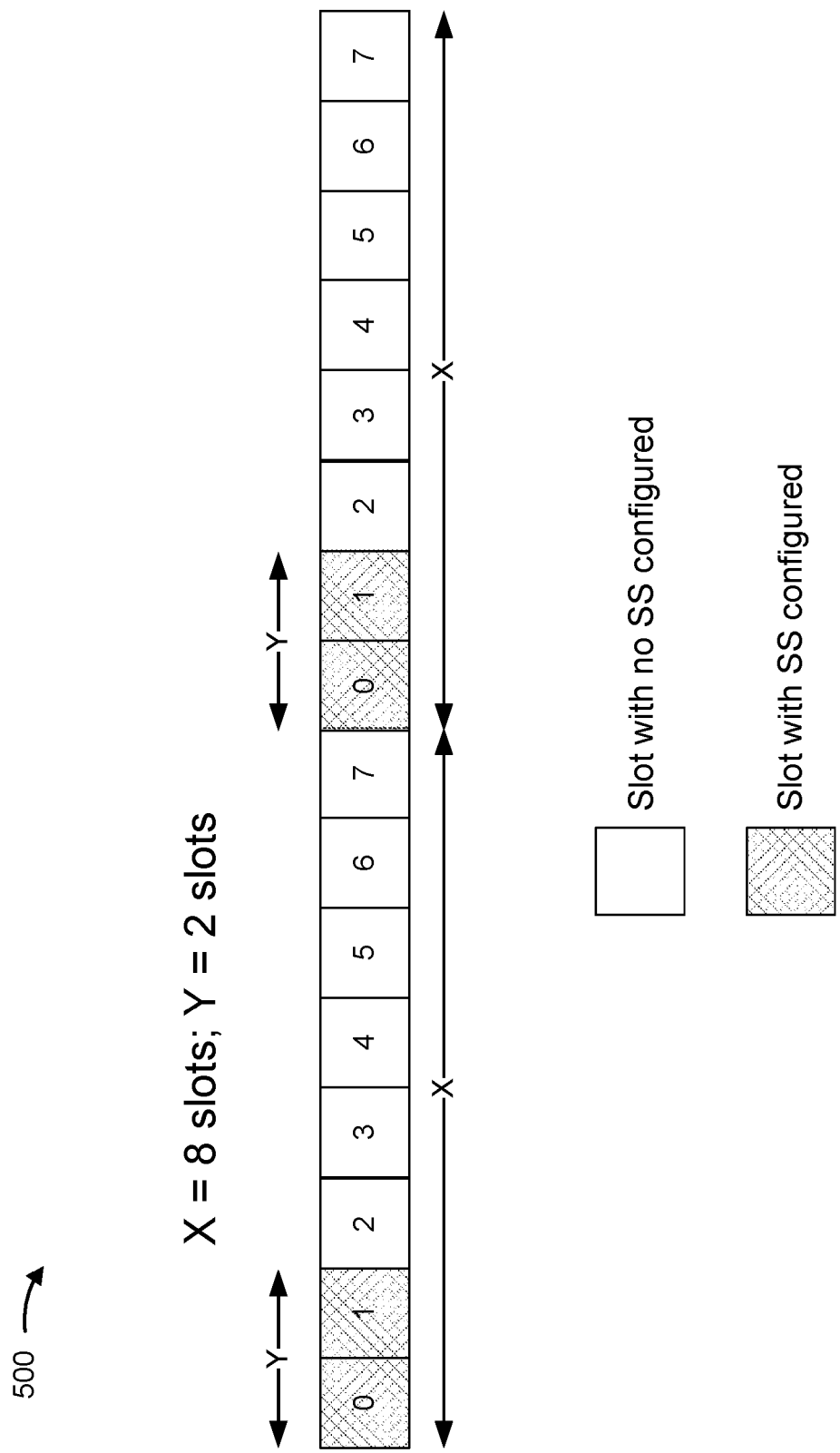
FIG. 5 is a diagram illustrating an example of a multi-slot configuration for PDCCH monitoring, in accordance with the present disclosure.

FIG. 5 is a diagram illustrating an example 500 of a multi-slot configuration for PDCCH monitoring, in accordance with the present disclosure.

In some aspects, a PDCCH monitoring configuration may be applied at the slot level (e.g., in a multi-slot configuration). A UE may transmit capability information indicating support for one or more multi-slot configurations. For example, as shown in FIG. 5, a group of slots may include a number of individual slots, such as the slots numbered 0, 1, 2, 3, 4, 5, 6, and 7. One or more of the individual slots may be configured with a search space. For example, each of slots 0 and 1 (shown with a hatched fill) may be configured with one or more search spaces, whereas slots 2-7 ("non-hatched" slots, shown without a hatched fill) may not be configured with any search spaces. The multi-slot configuration may indicate a minimum length X for a group of slots. In some aspects, the minimum length X may be measured between an initial slot of a first group of consecutive slots configured with a search space and an initial slot of a second group of consecutive slots configured with a search space. The multi-slot configuration may also indicate a maximum number of consecutive slots Y including at least one search space, that is permitted, per group of slots (e.g., per span). While FIG. 5 shows two groups of slots each having eight individual slots, the multi-slot configuration may be configured for any number of groups of slots having any number of individual slots.

The multi-slot configuration (e.g., similar to the span configuration) may support numerous configurations, such the (2, 2), (4, 3), and (7, 3) configurations described above in connection with FIG. 4, and/or the (8, 2) configuration shown in connection with FIG. 5. The variable X defines a minimum spacing, so that, in the example of the (8, 2)

multi-slot configuration, an initial slot of a group of consecutive slots configured with a search space must be at least eight (e.g., eight or more) slots apart from an initial slot of the next group of consecutive slots configured with a search space. In some aspects, the variable X may define a minimum spacing between slots other than the initial slots in the group of consecutive slots. For example, the variable X may define a minimum spacing between a last slot of a first group of consecutive slots configured with a search space and a last slot of a second group of consecutive slots configured with a search space. The maximum slot duration Y may define a maximum number of consecutive slots configured with a search space per group of slots, so the group of slots may have a single slot, or the maximum of two consecutive slots, configured with a search space, without being overbooked.

In some cases, the multi-slot PDCCH monitoring capability of the UE may be enabled in different configurations. For example, in a first configuration, the separation between two groups of slots may be fixed to X slots. This may allow for simpler BD/CCE budget management (e.g., overbooking and dropping), but may limit a flexibility of the PDCCH monitoring capabilities of the UE. In a second configuration, the separation between the two groups of slots may be flexible (but needs to be at least X slots). For example, the network node may be allowed to signal and use a variable (e.g., longer) spacing between groups of consecutive slots, which may be referred to herein as a slot group length and represented by Z. This may enable higher flexibility in the PDCCH monitoring capabilities of the UE, but may result in more complicated BD/CCE budget management. For example, the selective usage of a longer spacing between groups of consecutive slots may lead to an irregular pattern of groups of slots, which complicates BD/CCE accounting, overbooking detection, and dropping of search spaces.

As indicated above, FIG. 5 is provided as an example. Other examples may differ from what is described with regard to FIG. 5.

Figure 6:
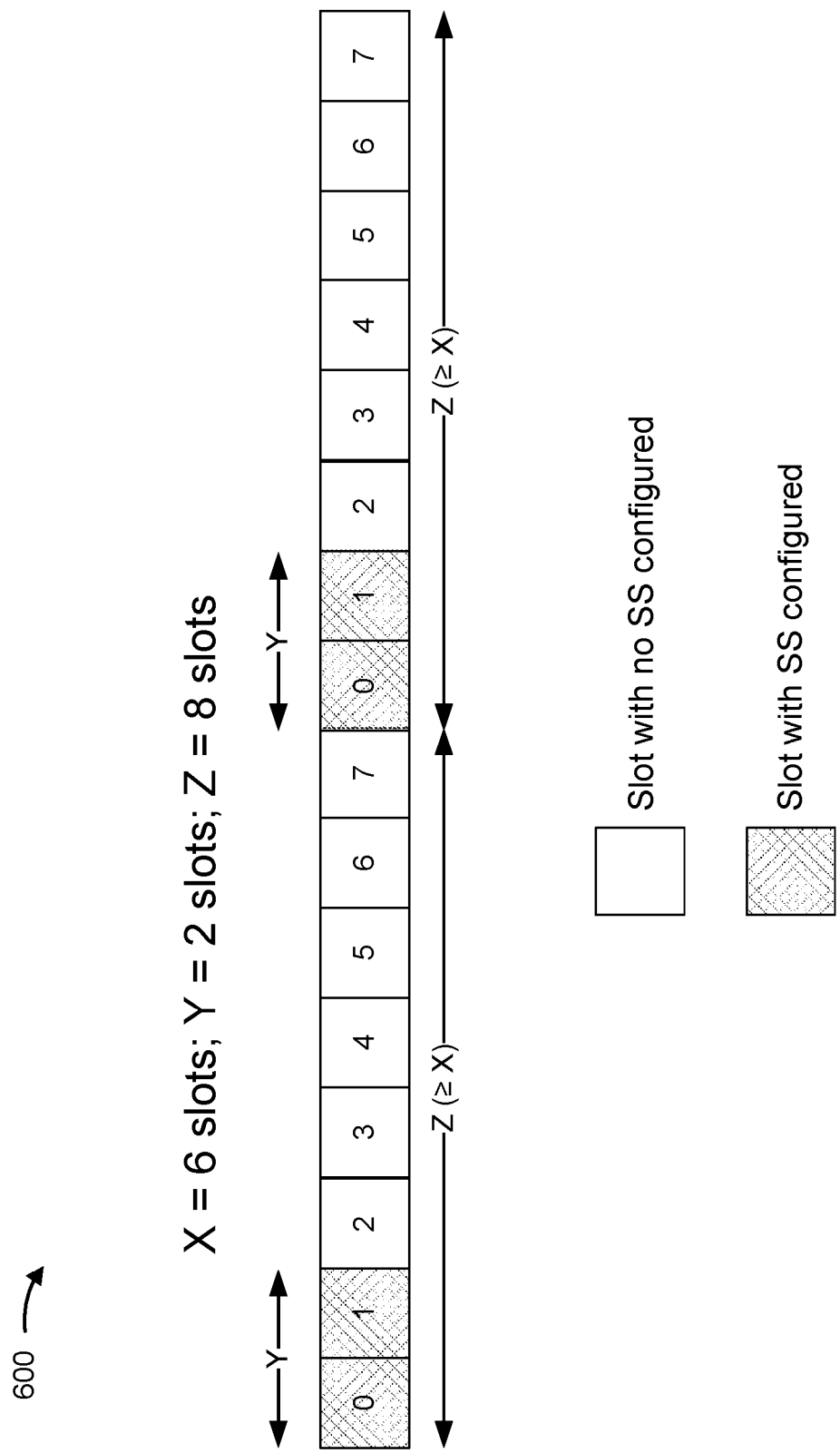
FIG. 6 is a diagram illustrating an example of a multi-slot configuration for PDCCH monitoring incorporating a slot group length, in accordance with the present disclosure.

FIG. 6 is a diagram illustrating an example 600 of a multi-slot configuration for PDCCH monitoring incorporating a slot group length, in accordance with the present disclosure.

Figure 7:
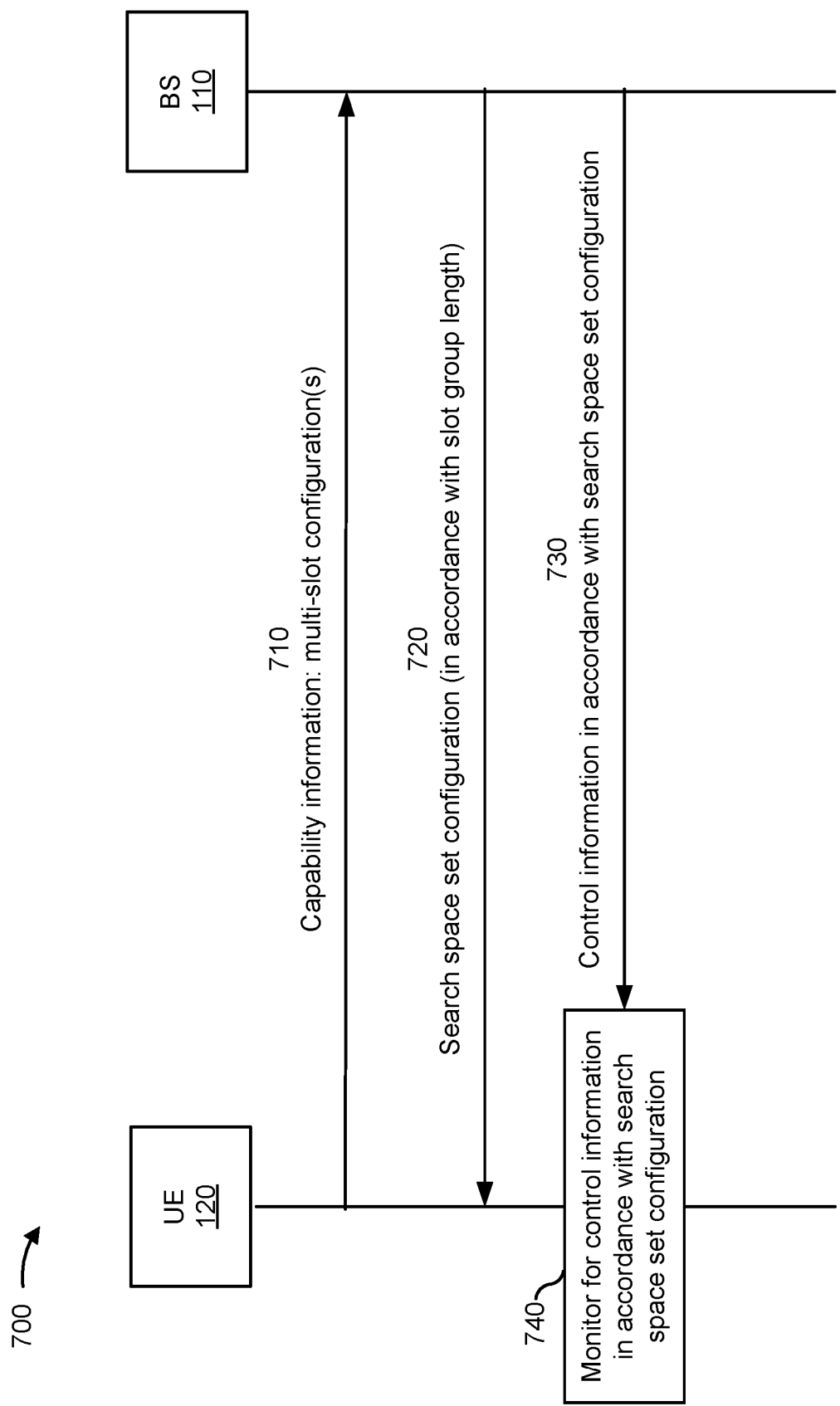
FIG. 7 is a diagram illustrating an example of signaling associated with a multi-slot configuration for PDCCH monitoring incorporating a slot group length, in accordance with the present disclosure.

Techniques and apparatuses described herein provide a multi-slot configuration for PDCCH monitoring using a slot group length that is at least as long as the minimum length X for a group of slots. For example, as shown in FIG. 6, slots may be divided into a plurality of groups of slots of length Z, where Z is greater than or equal to X Each group of slots may include Z consecutive and non-overlapping slots. In some aspects, the length of each group of slots may be fixed at Z. By using a consistent slot group length (as opposed to selectively using or not using Z from slot group to slot group), BD/CCE budget management is simplified (e.g., due to the regular and repeating pattern, BD/CCE accounting, overbooking, and dropping determination can be performed one time, rather than each time the size of a slot group changes). Furthermore, using the slot group length provides flexibility regarding a periodicity of PDCCH monitoring, such that the PDCCH monitoring periodicity can be any value larger than or equal to X For the multi-slot configuration incorporating the slot group length Z, groups of contiguous slots (shown by "Y"), may be separated by at least the minimum length X, such that the capabilities of the UE are not exceeded. FIG. 7 provides additional detail regarding signaling associated with the multi-slot configuration using the slot group length.

As indicated above, FIG. 6 is provided as an example. Other examples may differ from what is described with regard to FIG. 6.

FIG. 7 is a diagram illustrating an example 700 of signaling associated with a multi-slot configuration for PDCCH monitoring incorporating a slot group length, in accordance with the present disclosure. As shown, example 700 includes a UE 120 and a BS 110. In some aspects, one or more operations of example 700, described as being performed by the BS 110, may be performed by a network entity of the BS 110. For example, the BS 110 may be a disaggregated BS, such as in a disaggregated RAN.

As shown by reference number 710, the UE 120 may transmit, and the BS 110 may receive, capability information. The capability information may indicate one or more PDCCH monitoring capabilities, such as one or more PDCCH monitoring capabilities corresponding to one or more multi-slot configurations. For example, the capability information may indicate one or more combinations of a minimum length (X) and a maximum number of consecutive slots including at least one search space per group of slots (Y) (e.g., one or more (X,Y) combinations) supported by the UE 120. Furthermore, the capability information may indicate, for the one or more multi-slot configurations, one or more BD/CCE limits. For example, for an (X,Y) combination, the capability information may indicate a maximum number of BDs and a maximum number of CCEs. In some aspects, the capability information may indicate a slot group length (Z) associated with a multi-slot configuration, as described in more detail below.

As shown by reference number 720, the BS 110 may transmit, and the UE 120 may receive, a search space set configuration. For example, the BS 110 (e.g., a central unit of the BS 110) may determine the search space set configuration. The BS 110 (e.g., a radio unit of the BS 110 or a distributed unit of the BS 110) may transmit the search space set configuration. The search space set configuration may be associated with a plurality of search spaces. For example, the search space set configuration may configure a plurality of search spaces. The search space set configuration may be based at least in part on the capability information. For example, the search space set configuration may configure search spaces in a fashion that conforms with a PDCCH monitoring capability of the UE 120 (e.g., so that no particular group of slots includes a number of consecutive slots with at least one search space that exceeds the maximum number of consecutive slots).

The search space set configuration may be based at least in part on a slot group length (Z). In some aspects, the search space set configuration, or other signaling from the BS 110, may indicate the slot group length. Indication of the slot group length by the BS 110 conserves processing resources of the UE 120 that would otherwise be used to determine the slot group length. In some other aspects, the UE 120 may determine the slot group length based at least in part on the search space set configuration. For example, the UE 120 may identify a slot group length that conforms with the search space set configuration. In some aspects, the slot group length may be between the minimum length (X) and 2X−1 (e.g., two times the minimum length, minus one).

The search space set configuration may indicate a plurality of search spaces. The plurality of search spaces may be arranged in one or more groups of slots such that a PDCCH monitoring capability indicated by the capability information is not exceeded. If the PDCCH monitoring capability indicated by the capability information is exceeded, then the UE 120 may drop one or more search spaces until the PDCCH monitoring capability is no longer exceeded.

In some aspects, a group of contiguous slots that each include at least one search space may be referred to as a span. The search space set configuration may include one or more spans of at most Y slots. Each span may be spaced in accordance with X (e.g., by at least the minimum length). For example, if X indicates a minimum number of slots between initial slots of two spans, then initial slots of each span may be separated by at least X slots. In some aspects, each span may be placed at the beginning of a group of Z slots. In some other aspects, a span may be located at a different location in a group of Z slots. For example, a span may start at slot K, where $0 \leq K \leq Z-Y-1$. As another example, referring to FIG. 6, the span in the second group of slots might occupy slots 2 and 3 instead of slots 0 and 1, so long as the span in the second group of slots is separated from the span in the first group of slots in accordance with X.

In some aspects, the location of a span within a group of slots may change over time (e.g., from one group of slots to the next group of slots). In such aspects, the span may be placed so that X is satisfied. In some aspects, the location may be indicated to the UE 120 by the BS 110 (e.g., via DCI, medium access control (MAC) signaling, or RRC signaling). In some other aspects, the UE 120 may identify the location. For example, based at least in part on the search space set configuration, the UE 120 may identify a location for a span that complies with the search space set configuration.

In some aspects, the UE 120 may report multiple PDCCH monitoring capabilities (e.g., a plurality of PDCCH monitoring capabilities). If the UE 120 reports multiple PDCCH monitoring capabilities, and if a value of the slot group length (Z) complies with two or more of the multiple PDCCH monitoring capabilities, then the search space set configuration may be based at least in part on a selected PDCCH monitoring capability of the multiple PDCCH monitoring capabilities. For example, the selected PDCCH monitoring capability may be associated with a largest CCE limit and a largest BD limit of CCE limits and BD limits of the two or more PDCCH monitoring capabilities. As a more particular example, a UE may report $(X_1,Y_1)$ and $(X_2,Y_2)$ for multi-slot PDCCH monitoring capabilities, wherein $X_2 > X_1$, $Y_1 = Y_2$, $(X_1,Y_1)$ BD and CCE limits are $B_1$ and $C_1$, $(X_2,Y_2)$ BD and CCE limits are $B_2$ and $C_2$, respectively, and $B_2 \geq B_1$ and $C_2 \geq C_1$. For $Z \geq X_2$, both $(X_1,Y_1)$ and $(X_2,Y_2)$ capabilities can be applied. However, since $B_2 \geq B_1$ and $C_2 \geq C_1$, the BS 110 and UE 120 may determine that the $(X_2,Y_2)$ capability and BD/CCE limit $(B_2,C_2)$ are applied for the search space set configuration. In some aspects, the BS 110 may select the selected PDCCH monitoring capability from the two or more PDCCH monitoring capabilities, and the BS 110 may transmit signaling indicating the selected PDCCH monitoring capability (e.g., DCI, MAC signaling, or RRC signaling).

As shown by reference number 730, the BS 110 (e.g., a distributed unit or a radio unit of the BS 110) may transmit control information based at least in part on the search space set configuration. As shown by reference number 740, the UE 120 may monitor for the control information based at least in part on the search space set configuration. For example, the UE 120 may monitor one or more search spaces configured by the search space set configuration for the control information. In this way, the UE 120 and the BS 110 may use a slot group length (Z), which may be greater than or equal to the minimum spacing between spans (X), which provides increased flexibility of search space configuration for the BS 110 and simplified BD/CCE management.

As indicated above, FIG. 7 is provided as an example. Other examples may differ from what is described with regard to FIG. 7.

FIG. 8 is a diagram illustrating an example process 800 performed, for example, by a UE, in accordance with the present disclosure. Example process 800 is an example where the UE (e.g., UE 120) performs operations associated with a flexible slot group for multiple slot control channel monitoring.

As shown in FIG. 8, in some aspects, process 800 may include transmitting capability information indicating a PDCCH monitoring capability, wherein the PDCCH monitoring capability indicates a minimum length for a group of slots and a maximum number of consecutive slots including at least one search space within the group of slots (block 810). For example, the UE (e.g., using communication manager 140 and/or transmission component 1004, depicted in FIG. 10) may transmit capability information indicating a PDCCH monitoring capability, wherein the PDCCH monitoring capability indicates a minimum length for a group of slots and a maximum number of consecutive slots including at least one search space within the group of slots, as described above.

As further shown in FIG. 8, in some aspects, process 800 may include receiving a search space set configuration associated with a plurality of search spaces, wherein the search space set configuration is based at least in part on a slot group length that is greater than or equal to the minimum length (block 820). For example, the UE (e.g., using communication manager 140 and/or reception component 1002, depicted in FIG. 10) may receive a search space set configuration associated with a plurality of search spaces, wherein the search space set configuration is based at least in part on a slot group length that is greater than or equal to the minimum length, as described above.

As further shown in FIG. 8, in some aspects, process 800 may include monitoring for control information based at least in part on the search space set configuration (block 830). For example, the UE (e.g., using communication manager 140 and/or monitoring component 1008, depicted in FIG. 10) may monitor for control information based at least in part on the search space set configuration, as described above.

Process 800 may include additional aspects, such as any single aspect or any combination of aspects described below and/or in connection with one or more other processes described elsewhere herein.

In a first aspect, the search space set configuration indicates a first group of consecutive slots that each include at least one search space and a second group of consecutive slots that each include at least one search space, and wherein the first group of consecutive slots is spaced from the second group of consecutive slots by at least the minimum length.

In a second aspect, alone or in combination with the first aspect, the first group of consecutive slots is in a first slot group having the slot group length and the second group of consecutive slots is in a second slot group having the slot group length.

In a third aspect, alone or in combination with one or more of the first and second aspects, process 800 includes receiving signaling indicating a location of the first group of consecutive slots or a location of the second group of consecutive slots.

In a fourth aspect, alone or in combination with one or more of the first through third aspects, process 800 includes identifying, based at least in part on the search space set configuration, a location of the first group of consecutive slots or a location of the second group of consecutive slots.

In a fifth aspect, alone or in combination with one or more of the first through fourth aspects, process 800 includes receiving an indication of the slot group length.

In a sixth aspect, alone or in combination with one or more of the first through fifth aspects, process 800 includes determining the slot group length based at least in part on the search space set configuration.

In a seventh aspect, alone or in combination with one or more of the first through sixth aspects, the slot group length is not greater than two times the minimum length, minus one.

In an eighth aspect, alone or in combination with one or more of the first through seventh aspects, the capability information indicates a plurality of PDCCH monitoring capabilities, and wherein monitoring for control information based at least in part on the search space set configuration is based at least in part on a selected PDCCH monitoring capability of the plurality of PDCCH monitoring capabilities.

In a ninth aspect, alone or in combination with one or more of the first through eighth aspects, the selected PDCCH monitoring capability is associated with a largest control channel element limit and a largest blind decode limit, of control channel element limits and blind decode limits of the plurality of PDCCH monitoring capabilities.

In a tenth aspect, alone or in combination with one or more of the first through ninth aspects, process 800 includes receiving signaling indicating the selected PDCCH monitoring capability.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., base station 110, one or more components of a disaggregated base station) performs operations associated with a flexible slot group for multiple slot control channel monitoring. In some aspects, one or more operations described herein as being performed by the BS 110 may be performed by a network node of the BS 110. For example, the BS 110 may be a disaggregated BS, such as in a disaggregated RAN.

As shown in FIG. 9, in some aspects, process 900 may include receiving, from a UE, capability information indicating a PDCCH monitoring capability, wherein the PDCCH monitoring capability indicates a minimum length for a group of slots and a maximum number of consecutive slots that include at least one search space within the group of slots (block 910). For example, the network node (e.g., using communication manager 150 and/or reception component 1102, depicted in FIG. 11) may receive, from a UE, capability information indicating a PDCCH monitoring capability, wherein the PDCCH monitoring capability indicates a minimum length for a group of slots and a maximum number of consecutive slots that include at least one search space within the group of slots, as described above.

As further shown in FIG. 9, in some aspects, process 900 may include transmitting a search space set configuration associated with a plurality of search spaces, wherein the search space set configuration is based at least in part on a slot group length that is greater than or equal to the minimum length (block 920). For example, the network node (e.g., using communication manager 150 and/or reception component 1102, depicted in FIG. 11) may transmit a search space set configuration associated with a plurality of search spaces, wherein the search space set configuration is based at least in part on a slot group length that is greater than or equal to the minimum length, as described above.

As further shown in FIG. 9, in some aspects, process 900 may include transmitting control information based at least in part on the search space set configuration (block 930). For example, the network node (e.g., using communication manager 150 and/or transmission component 1104, depicted in FIG. 11) may transmit control information based at least in part on the search space set configuration, as described above.

Process 900 may include additional aspects, such as any single aspect or any combination of aspects described below and/or in connection with one or more other processes described elsewhere herein.

In a first aspect, the search space set configuration indicates a first group of consecutive slots that each include at least one search space and a second group of consecutive slots that each include at least one search space, and wherein the first group of consecutive slots is spaced from the second group of consecutive slots by at least the minimum length.

In a second aspect, alone or in combination with the first aspect, the first group of consecutive slots is in a first slot group of the slot group length and the second group of consecutive slots is in a second slot group of the slot group length.

In a third aspect, alone or in combination with one or more of the first and second aspects, process 900 includes transmitting signaling that indicates a location of the first group of consecutive slots or the second group of consecutive slots.

In a fourth aspect, alone or in combination with one or more of the first through third aspects, process 900 includes identifying, based at least in part on the search space set configuration, a location of the first group of consecutive slots or a location of the second group of consecutive slots.

In a fifth aspect, alone or in combination with one or more of the first through fourth aspects, process 900 includes transmitting an indication of the slot group length.

In a sixth aspect, alone or in combination with one or more of the first through fifth aspects, the slot group length is, at most, two times the minimum length, minus one.

In a seventh aspect, alone or in combination with one or more of the first through sixth aspects, the capability information indicates a plurality of PDCCH monitoring capabilities, and transmitting control information based at least in part on the search space set configuration is based at least in part on a selected PDCCH monitoring capability of the plurality of PDCCH monitoring capabilities.

In an eighth aspect, alone or in combination with one or more of the first through seventh aspects, the selected PDCCH monitoring capability is associated with a largest control channel element limit and a largest blind decode limit, of control channel element limits and blind decode limits of the plurality of PDCCH monitoring capabilities.

In a ninth aspect, alone or in combination with one or more of the first through eighth aspects, process 900 includes transmitting signaling indicating the selected PDCCH monitoring capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
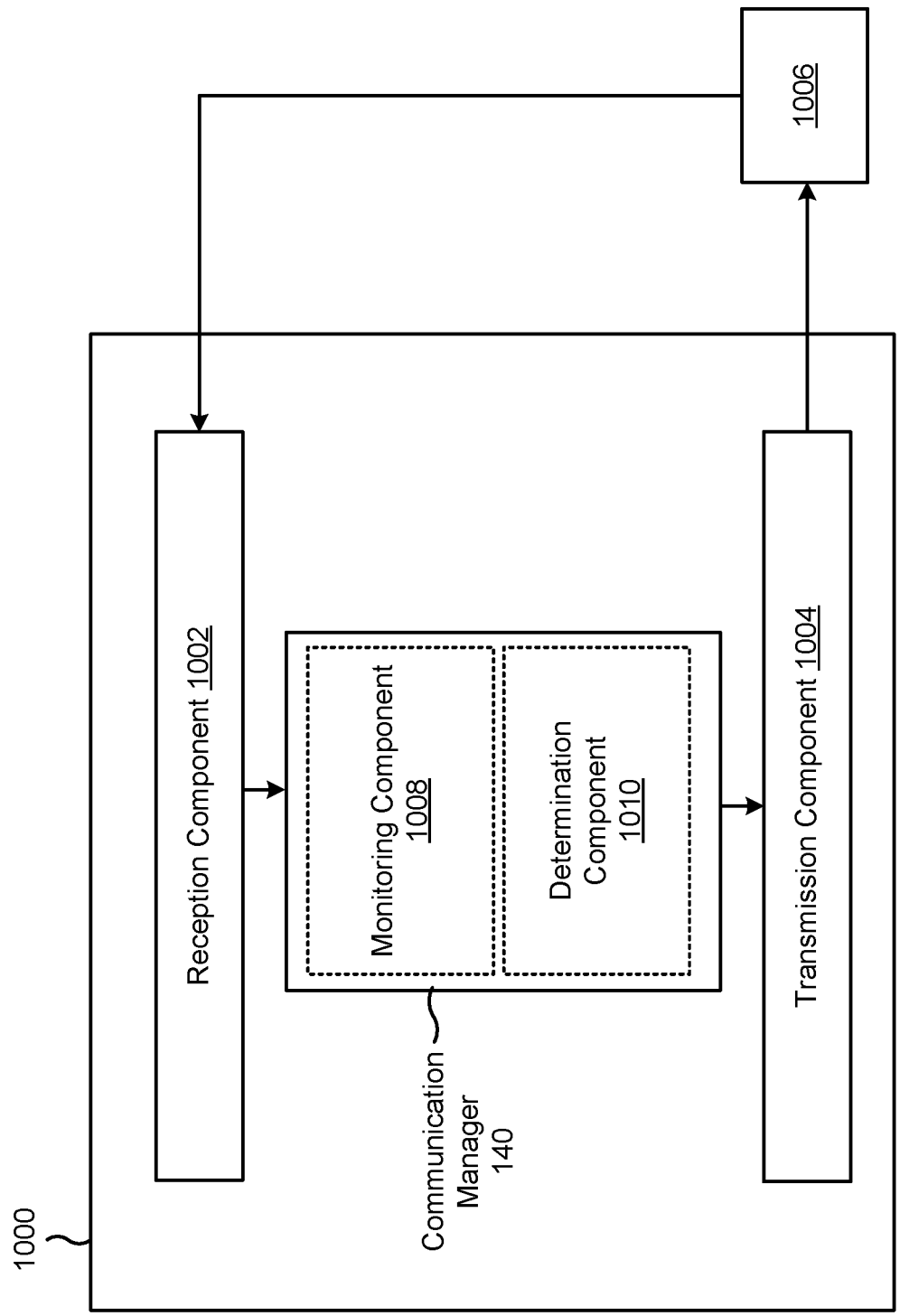
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a monitoring component 1008 or a determination component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit capability information indicating a PDCCH monitoring capability, wherein the PDCCH monitoring capability indicates a minimum length for a group of slots and a maximum number of consecutive slots including at least one search space within the group of slots. The reception component 1002 may receive a search space set configuration associated with a plurality of search spaces, wherein the search space set configuration is based at least in part on a slot group length that is greater than or equal to the minimum length. The monitoring component 1008 may monitor for control information based at least in part on the search space set configuration.

The reception component 1002 may receive signaling indicating a location of the first group of consecutive slots or a location of the second group of consecutive slots.

The determination component 1010 may identify, based at least in part on the search space set configuration, a location of the first group of consecutive slots or a location of the second group of consecutive slots.

The reception component 1002 may receive an indication of the slot group length.

The determination component 1010 may determine the slot group length based at least in part on the search space set configuration.

The reception component 1002 may receive signaling indicating the selected PDCCH monitoring capability.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
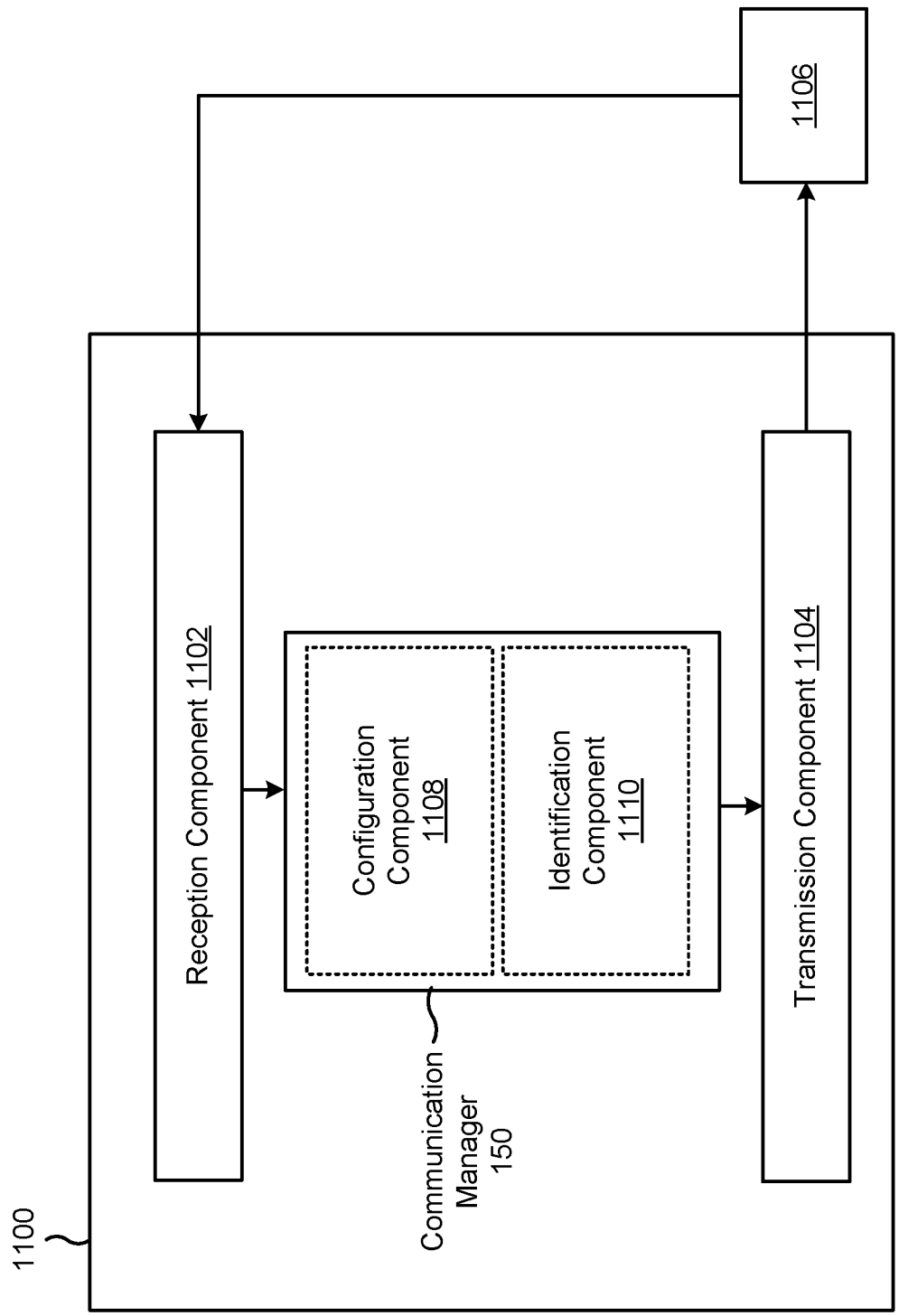
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a base station, or a base station may include the apparatus 1100. In some aspects, the apparatus 1100 is a network node of a disaggregated base station. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a configuration component 1108 or an identification component 1110, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver. In some aspects, the transmission component 1104 and/or the reception component 1102 may be associated with a network interface that provides fronthaul, midhaul, or backhaul communication with network entities other than the apparatus 1100 (e.g., the apparatus 1106).

The reception component 1102 may receive, from a UE, capability information indicating a PDCCH monitoring capability, wherein the PDCCH monitoring capability indicates a minimum length for a group of slots and a maximum number of consecutive slots that include at least one search space within the group of slots. The transmission component 1104 or the configuration component 1108 may transmit a search space set configuration associated with a plurality of search spaces, wherein the search space set configuration is based at least in part on a slot group length that is greater than or equal to the minimum length. The transmission component 1104 may transmit control information based at least in part on the search space set configuration.

The transmission component 1104 may transmit signaling that indicates a location of the first group of consecutive slots or the second group of consecutive slots.

The identification component 1110 may identify, based at least in part on the search space set configuration, a location of the first group of consecutive slots or a location of the second group of consecutive slots.

The transmission component 1104 may transmit an indication of the slot group length.

The transmission component 1104 may transmit signaling indicating the selected PDCCH monitoring capability.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting capability information indicating a physical downlink control channel (PDCCH) monitoring capability, wherein the PDCCH monitoring capability indicates a minimum length for a group of slots and a maximum number of consecutive slots including at least one search space within the group of slots; receiving a search space set configuration associated with a plurality of search spaces, wherein the search space set configuration is based at least in part on a slot group length that is greater than or equal to the minimum length; and monitoring for control information based at least in part on the search space set configuration.

Aspect 2: The method of Aspect 1, wherein the search space set configuration indicates a first group of consecutive slots that each include at least one search space and a second group of consecutive slots that each include at least one search space, and wherein the first group of consecutive slots is spaced from the second group of consecutive slots by at least the minimum length.

Aspect 3: The method of Aspect 2, wherein the first group of consecutive slots is in a first slot group having the slot group length and the second group of consecutive slots is in a second slot group having the slot group length.

Aspect 4: The method of Aspect 2, further comprising: receiving signaling indicating a location of the first group of consecutive slots or a location of the second group of consecutive slots.

Aspect 5: The method of Aspect 2, further comprising: identifying, based at least in part on the search space set configuration, a location of the first group of consecutive slots or a location of the second group of consecutive slots.

Aspect 6: The method of any of Aspects 1-5, further comprising: receiving an indication of the slot group length.

Aspect 7: The method of any of Aspects 1-5, further comprising: determining the slot group length based at least in part on the search space set configuration.

Aspect 8: The method of any of Aspects 1-7, wherein the slot group length is not greater than two times the minimum length, minus one.

Aspect 9: The method of any of Aspects 1-8, wherein the capability information indicates a plurality of PDCCH monitoring capabilities, and wherein monitoring for control information based at least in part on the search space set configuration is based at least in part on a selected PDCCH monitoring capability of the plurality of PDCCH monitoring capabilities.

Aspect 10: The method of Aspect 9, wherein the selected PDCCH monitoring capability is associated with a largest control channel element limit and a largest blind decode limit, of control channel element limits and blind decode limits of the plurality of PDCCH monitoring capabilities.

Aspect 11: The method of Aspect 9, further comprising: receiving signaling indicating the selected PDCCH monitoring capability.

Aspect 12: A method of wireless communication performed by a network node, comprising: receiving, from a user equipment (UE), capability information indicating a physical downlink control channel (PDCCH) monitoring capability, wherein the PDCCH monitoring capability indicates a minimum length for a group of slots and a maximum number of consecutive slots that include at least one search space within the group of slots; transmitting a search space set configuration associated with a plurality of search spaces, wherein the search space set configuration is based at least in part on a slot group length that is greater than or equal to the minimum length; and transmitting control information based at least in part on the search space set configuration.

Aspect 13: The method of Aspect 12, wherein the search space set configuration indicates a first group of consecutive slots that each include at least one search space and a second group of consecutive slots that each include at least one search space, and wherein the first group of consecutive slots is spaced from the second group of consecutive slots by at least the minimum length.

Aspect 14: The method of Aspect 13, wherein the first group of consecutive slots is in a first slot group of the slot group length and the second group of consecutive slots is in a second slot group of the slot group length.

Aspect 15: The method of Aspect 13, further comprising: transmitting signaling that indicates a location of the first group of consecutive slots or the second group of consecutive slots.

Aspect 16: The method of Aspect 13, further comprising: identifying, based at least in part on the search space set configuration, a location of the first group of consecutive slots or a location of the second group of consecutive slots.

Aspect 17: The method of any of Aspects 12-16, further comprising:
transmitting an indication of the slot group length.

Aspect 18: The method of any of Aspects 12-17, wherein the slot group length is, at most, two times the minimum length, minus one.

Aspect 19: The method of any of Aspects 12-18, wherein the capability information indicates a plurality of PDCCH monitoring capabilities, and transmitting control information based at least in part on the search space set configuration is based at least in part on a selected PDCCH monitoring capability of the plurality of PDCCH monitoring capabilities.

Aspect 20: The method of Aspect 19, wherein the selected PDCCH monitoring capability is associated with a largest control channel element limit and a largest blind decode limit, of control channel element limits and blind decode limits of the plurality of PDCCH monitoring capabilities.

Aspect 21: The method of Aspect 20, further comprising: transmitting signaling indicating the selected PDCCH monitoring capability.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to cause the UE to:
     transmit capability information indicating a physical downlink control channel (PDCCH) monitoring capability, wherein the PDCCH monitoring capability indicates a minimum length for a group of slots and a maximum number of consecutive slots including at least one search space within the group of slots;
     receive a search space set configuration associated with a plurality of search spaces, wherein the search space set configuration is based at least in part on a slot group length that is greater than or equal to the minimum length, wherein:
       the search space set configuration indicates a first group of consecutive slots that each include at least one search space and a second group of consecutive slots that each include at least one search space,
       the first group of consecutive slots is spaced from the second group of consecutive slots by at least the minimum length, and
       the first group of consecutive slots is in a first slot group having the slot group length and the second group of consecutive slots is in a second slot group having the slot group length; and
     monitor for control information based at least in part on the search space set configuration.

2. The UE of claim 1, wherein the one or more processors are individually or collectively configured to cause the UE to:
   receive signaling indicating a location of the first group of consecutive slots or a location of the second group of consecutive slots.

3. The UE of claim 1, wherein the one or more processors are individually or collectively configured to cause the UE to:
   identify, based at least in part on the search space set configuration, a location of the first group of consecutive slots or a location of the second group of consecutive slots.

4. The UE of claim 1, wherein the one or more processors are individually or collectively configured to cause the UE to:
   receive an indication of the slot group length.

5. The UE of claim 1, wherein the one or more processors are individually or collectively configured to cause the UE to:
   determine the slot group length based at least in part on the search space set configuration.

6. The UE of claim 1, wherein the slot group length is not greater than two times the minimum length, minus one.

7. The UE of claim 1, wherein the capability information indicates a plurality of PDCCH monitoring capabilities, and wherein monitoring for control information based at least in part on the search space set configuration is based at least in part on a selected PDCCH monitoring capability of the plurality of PDCCH monitoring capabilities.

8. The UE of claim 7, wherein the selected PDCCH monitoring capability is associated with a largest control channel element limit and a largest blind decode limit, of control channel element limits and blind decode limits of the plurality of PDCCH monitoring capabilities.

9. The UE of claim 7, wherein the one or more processors are individually or collectively configured to cause the UE to:
   receive signaling indicating the selected PDCCH monitoring capability.

10. A network node for wireless communication, comprising:
    one or more memories; and
    one or more processors, coupled to the one or more memories, individually or collectively configured to cause the network node to:
      receive, from a user equipment (UE), capability information indicating a physical downlink control channel (PDCCH) monitoring capability, wherein the PDCCH monitoring capability indicates a minimum length for a group of slots and a maximum number of consecutive slots that include at least one search space within the group of slots;
      transmit a search space set configuration associated with a plurality of search spaces, wherein the search space set configuration is based at least in part on a slot group length that is greater than or equal to the minimum length, wherein:
        the search space set configuration indicates a first group of consecutive slots that each include at least one search space and a second group of consecutive slots that each include at least one search space,
        the first group of consecutive slots is spaced from the second group of consecutive slots by at least the minimum length, and the first group of consecutive slots is in a first slot group of the slot group length and the second group of consecutive slots is in a second slot group of the slot group length; and transmit control information based at least in part on the search space set configuration.

11. The network node of claim 10, wherein the one or more processors are individually or collectively configured to cause the network node to:

transmit signaling that indicates a location of the first group of consecutive slots or the second group of consecutive slots.

12. The network node of claim 10, wherein the one or more processors are individually or collectively configured to cause the network node to:

identify, based at least in part on the search space set configuration, a location of the first group of consecutive slots or a location of the second group of consecutive slots.

13. The network node of claim 10, wherein the one or more processors are individually or collectively configured to cause the network node to:

transmit an indication of the slot group length.

14. The network node of claim 10, wherein the slot group length is, at most, two times the minimum length, minus one.

15. The network node of claim 10, wherein the capability information indicates a plurality of PDCCH monitoring capabilities, and transmitting control information based at least in part on the search space set configuration is based at least in part on a selected PDCCH monitoring capability of the plurality of PDCCH monitoring capabilities.

16. The network node of claim 15, wherein the selected PDCCH monitoring capability is associated with a largest control channel element limit and a largest blind decode limit, of control channel element limits and blind decode limits of the plurality of PDCCH monitoring capabilities.

17. The network node of claim 16, wherein the one or more processors are individually or collectively configured to cause the network node to:

transmit signaling indicating the selected PDCCH monitoring capability.

18. A method of wireless communication performed by a user equipment (UE), comprising:

transmitting capability information indicating a physical downlink control channel (PDCCH) monitoring capability, wherein the PDCCH monitoring capability indicates a minimum length for a group of slots and a maximum number of consecutive slots including at least one search space within the group of slots;

receiving a search space set configuration associated with a plurality of search spaces, wherein the search space set configuration is based at least in part on a slot group length that is greater than or equal to the minimum length, wherein:

the search space set configuration indicates a first group of consecutive slots that each include at least one search space and a second group of consecutive slots that each include at least one search space, the first group of consecutive slots is spaced from the second group of consecutive slots by at least the minimum length, and the first group of consecutive slots is in a first slot group having the slot group length and the second group of consecutive slots is in a second slot group having the slot group length; and monitoring for control information based at least in part on the search space set configuration.

19. The method of claim 18, further comprising:
receiving signaling indicating a location of the first group of consecutive slots or a location of the second group of consecutive slots.

20. The method of claim 18, further comprising:
identifying, based at least in part on the search space set configuration, a location of the first group of consecutive slots or a location of the second group of consecutive slots.

21. A method of wireless communication performed by a network node, comprising:

receiving, from a user equipment (UE), capability information indicating a physical downlink control channel (PDCCH) monitoring capability, wherein the PDCCH monitoring capability indicates a minimum length for a group of slots and a maximum number of consecutive slots that include at least one search space within the group of slots;

transmitting a search space set configuration associated with a plurality of search spaces, wherein the search space set configuration is based at least in part on a slot group length that is greater than or equal to the minimum length, wherein:

the search space set configuration indicates a first group of consecutive slots that each include at least one search space and a second group of consecutive slots that each include at least one search space, the first group of consecutive slots is spaced from the second group of consecutive slots by at least the minimum length, and the first group of consecutive slots is in a first slot group of the slot group length and the second group of consecutive slots is in a second slot group of the slot group length; and transmitting control information based at least in part on the search space set configuration.

22. The method of claim 21, further comprising:
transmitting signaling that indicates a location of the first group of consecutive slots or the second group of consecutive slots.

\* \* \* \* \*